United States Patent
O'Neil (10) Patent No.: US 9,607,284 B2
(45) Date of Patent: Mar. 28, 2017

(54) INVENTORY CONTROL SYSTEM (71) Applicant: Encompass Technologies, LLP, Fort Collins, CO (US)

(72) Inventor: Jonathan W. O'Neil, Fort Collins, CO (US)

(73) Assignee: Encompass Technologies, LLP, Fort Collins, CO (US)

(*) Notice: Subject to any disclaimer, the term of this patent is extended or adjusted under 35 U.S.C. 154(b) by 96 days.

(21) Appl. No.: 13/956,244

(22) Filed: Jul. 31, 2013

(65) Prior Publication Data
US 2015/0039477 A1 Feb. 5, 2015

(51) Int. Cl.
*G06F 3/048* (2013.01)
*G06Q 10/08* (2012.01)
*G06F 3/0481* (2013.01)

(52) U.S. Cl.
CPC ......... *G06Q 10/087* (2013.01); *G06F 3/0481* (2013.01)

(58) Field of Classification Search
CPC .............................. G06Q 10/087; G06F 3/0481
USPC ........................................................ 705/28
See application file for complete search history.

(56) References Cited

U.S. PATENT DOCUMENTS

| | | | |
|---|---|---|---|
| 6,341,271 B1* | 1/2002 | Salvo | G06Q 10/087 705/28 |
| 6,539,280 B1* | 3/2003 | Valiulis et al. | 700/236 |
| 8,090,454 B1* | 1/2012 | Breitenbach et al. | 700/29 |
| 8,631,696 B2* | 1/2014 | Wicht | G01F 23/0023 73/290 R |
| 2005/0190072 A1* | 9/2005 | Brown | G06Q 10/087 340/6.1 |
| 2006/0015414 A1* | 1/2006 | Congram et al. | 705/28 |
| 2007/0174146 A1* | 7/2007 | Tamarkin | G06Q 10/087 705/28 |
| 2009/0319099 A1* | 12/2009 | Corbefin et al. | 701/3 |
| 2010/0106626 A1* | 4/2010 | Ashrafzadeh | G06F 17/30707 705/29 |
| 2010/0138037 A1* | 6/2010 | Adelberg | G06Q 10/087 700/241 |
| 2010/0169190 A1* | 7/2010 | Allison et al. | 705/28 |
| 2011/0173082 A1* | 7/2011 | Breitenbach et al. | 705/16 |

* cited by examiner

*Primary Examiner* — William Bashore
*Assistant Examiner* — Gregory A Distefano
(74) *Attorney, Agent, or Firm* — Craig R. Miles; CR Miles P.C.

(57) ABSTRACT

An computer-implemented inventory control system and a method of inventory control which includes an inventory control program executable to analyze a sensor signal generated by a distance sensor having a fixed position at a target location to calculate the inventory level of a target product positioned at the target location based on separation distance between the distance sensor and the target product.

10 Claims, 8 Drawing Sheets

INVENTORY CONTROL SYSTEM

I. FIELD OF THE INVENTION

A computer-implemented inventory control system and a method of inventory control which includes an inventory control program executable to analyze a sensor signal generated by a distance sensor having a fixed position at a target location to calculate the inventory level of a target product positioned at the target location based on separation distance between the distance sensor and the target product.

II. BACKGROUND OF THE INVENTION

Conventional inventory control systems may require a person to periodically travel to the location of the product(s) to inventory and to count the existing product(s) at a product location and calculate the difference between the prior counted inventory for the product at the product location and the current counted inventory for the product at the product location. To replace the product taken out of inventory, the person must then make arrangements with the manufacturer or the distributor of the product to ship replacement inventory for the product to the product location.

III. SUMMARY OF THE INVENTION

Accordingly a broad object of particular embodiments of the invention can be to provide a computer implemented inventory control system including a distance sensor having a fixed position in relation to a target location which generates a sensor signal which varies based on separation distance between the distance sensor and a target product positioned in relation to the distance sensor at the target location with the sensor signal analyzed by execution of a computer code to determine a separation distance between the distance sensor and said target product useful in calculating an inventory level of said target product positioned at the target location.

Another object of particular embodiments of the invention can be to provide a computer code contained in a computer readable media with the computer code executable to analyze a sensor signal to determine a separation distance between a distance sensor and a target product positioned at a target location and further executable to calculate an inventory level of the target product positioned at the target location and further executable to depict one or more user interactive graphical images on a graphical display surface which allow entry of a target identifier associated with target product characteristics of a target product and a target location identifier associated with target location characteristics of a target location and a distance sensor identifier associated with a distance sensor having a fixed position in relation to the target location which generates a sensor signal which varies based on separation distance between the distance sensor and a target product positioned in relation to the distance sensor at the target location with the computer code further executable to analyze a sensor signal generated by the distance sensor to determine a separation distance value which in the absence of a target product positioned in relation to a distance sensor at a target location and by analysis of the target product characteristics associated with the entered target identifier displays in the user interactive graphical image an inventory capacity value at the target location associated with the target identifier and can further function to generate and compare a first separation distance value and a second separation distance value to determine a change between a initial inventory level and a closing inventory level for the target product at the target location and can further function to depict in said user interactive graphical images a target product replenishment value for the target product at said target location.

Naturally, further objects of the invention are disclosed throughout other areas of the specification, drawings, photographs, and claims.

V. DETAILED DESCRIPTION OF THE INVENTION

Figure 1:
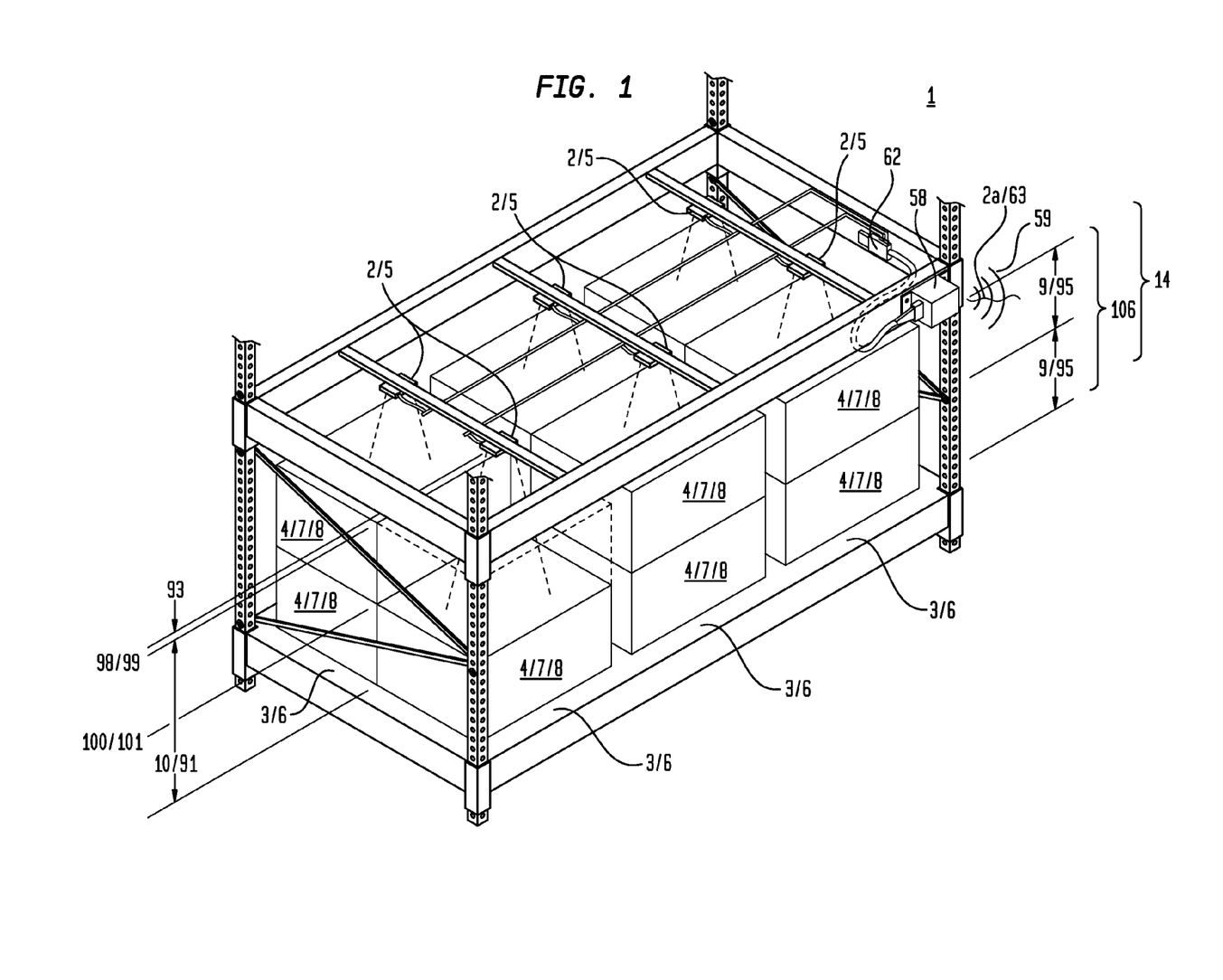
FIG. 1 is an illustration of a particular embodiment of the inventive computer implemented inventory control system and method of inventory control.
Figure 2:
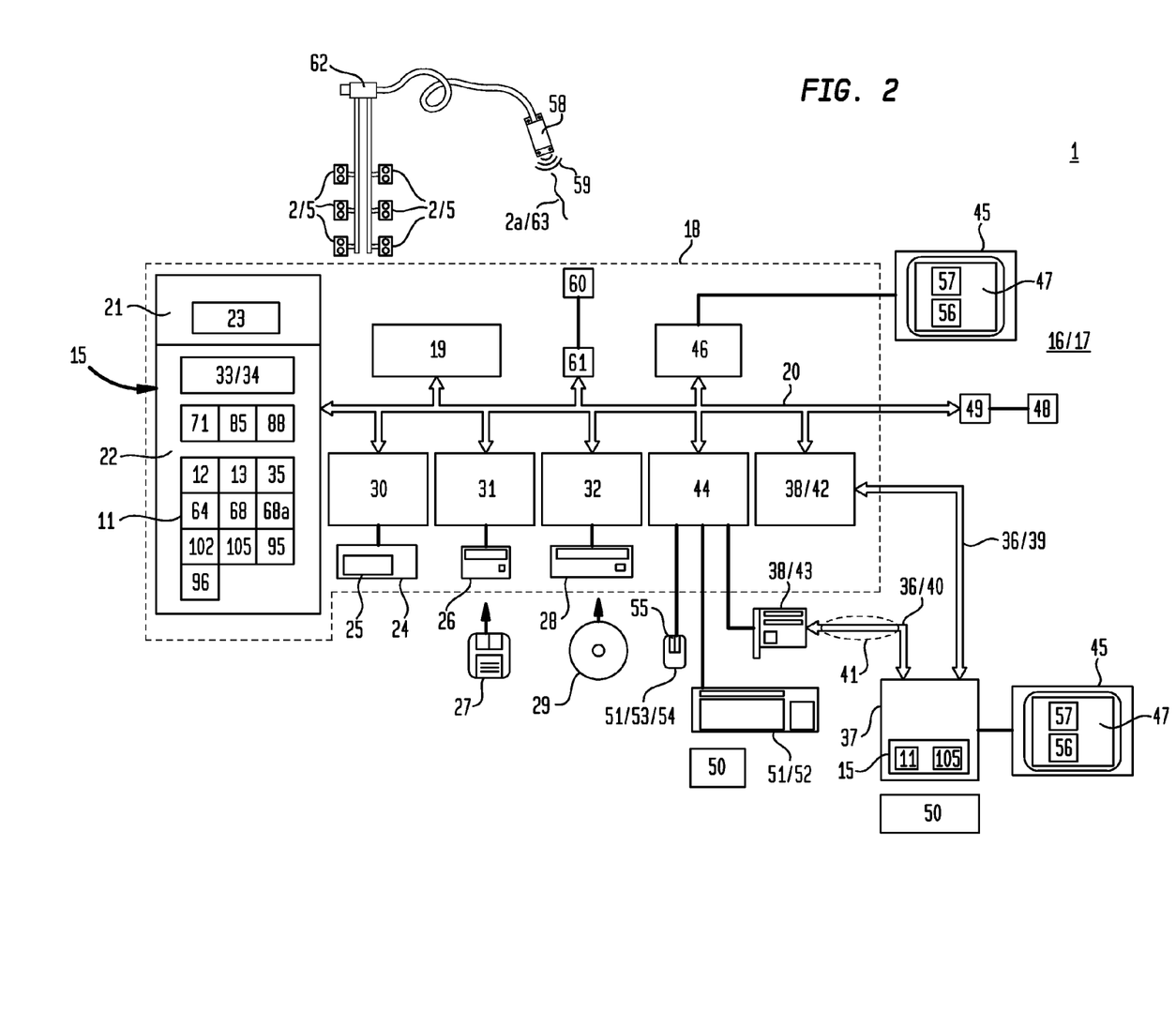
FIG. 2 is a block diagram of hardware means, computer means, and network means of a particular embodiment of the inventive computer implemented inventory control system and method of inventory control.

Now referring primarily to FIGS. 1 and 2, which provide a general overview of an embodiment of an inventive inventory control system (1) and a method of inventory control. Particular embodiments include distance sensor (2) having a fixed position in relation to a target location (3) of a target product (4).

The term "distance sensor" for the purposes of this invention can be one or more of an infrared sensor, a triangulation sensor, an ultrasonic sensor, or the like, or combinations thereof; however, these examples are not intended to limit the embodiments of the invention solely to the use of these illustrative types of distance sensors (2) but rather to provide a sufficient number of examples to allow a person of ordinary skill to make and use a wide variety of embodiments of the inventive inventory control system (1).

The term "target location" for the purposes of this invention can be any area, place, point, absolute location, shelf, slot, pin, or the like, at which a target product (4) can be located, shelved, pinned, hung, or the like, in relation to a distance sensor (2) whether inside or outside of an enclosure such as building, storage area, warehouse, casement, cabinet, or the like, or combinations thereof.

The term "target product" for the purposes of this invention can be goods, packaged goods, fast moving consumer goods, or otherwise which can be positioned, located, shelved, pinned, hung, or the like, whether individually, as a collection of individual goods, or as a collection of individual goods contained within a carton or container, stacked on a pallet, or the like, at a target location (3).

Now referring primarily to FIG. 1, as an illustrative example, one or more distance sensors (2) (such as an ultrasonic distance sensor (5)) can be positioned above a target location (3) (such as above a shelf location (6)). As to particular embodiments, the target product (4) can be a stack (7) of target product (4) (or stackable target product) positioned under the distance sensor (2) at the target location (3). The stack (7) of target product (4) can include one or more target product layers (8) each having a substantially uniform layer height (9) (as shown in the example of FIG. 1 the stack (7) of target product (4) can have two uniform target product layers (8)). The distance sensor (2) can generate a sensor signal (2a) which varies based on a separation distance (10) between the distance sensor (2) and the target product (4) or stack (7) of target product (4) at the target location (3).

Now referring primarily to FIG. 2, embodiments of the invention can further include a computer implemented inventory control program (11) including a signal analyzer (12) which analyzes the sensor signal (2a) to determine the separation distance (10) between the distance sensor (2) and the target product (4). The inventory control program (11) can further include an inventory calculator (13) which calculates an inventory level (14) of the target product (4) positioned at the target location (3) based on the separation distance (10) between the distance sensor (2) and the target product (4). As to particular embodiments, the functions of the signal analyzer (12) and the inventory calculator (13) can be implemented by execution of the inventory control program (11) contained in a memory element (15) (or on computer readable media) of the computer means (16) and the network means (17) utilized to practice embodiments of the an inventive inventory control system (1).

It is not intended that embodiments of the invention be practiced in only wide area computing environments or only in local computing environments, but rather the invention can be practiced in local computing environments or in distributed computing environments where functions or tasks are performed by remote processing devices that are linked through a communications network. In a distributed computing environment, program modules may be located in both a local or in a remote memory storage device(s) or device elements. While a preferred embodiment of the invention is described in the general context of computer-executable instructions of the inventory control program (11) or program modules which utilize routines, programs, objects, components, data structures, or the like, to perform particular functions or tasks or implement particular abstract data types, or the like, being executed by the computer means (16) and network means (17), it is not intended that any embodiments of the invention be limited to a particular set of computer-executable instructions or protocols.

FIG. 2 provides in general overview an illustrative example of computer means (16) which includes a first computer (18) having a processing unit (19), one or more memory elements (15), and a bus (20) (which operably couples certain components of the first computer (18), including without limitation the memory elements (15) to the processing unit (19). The processing unit (19) can comprise one central-processing unit (CPU), or a plurality of processing units which operate in parallel to process digital information. The bus (20) may be any of several types of bus configurations including a memory bus or memory controller, a peripheral bus, and a local bus using any of a variety of bus architectures. The memory element (15) can without limitation be a read only memory (ROM) (21) or a random access memory (RAM) (22), or both. A basic input/output system (BIOS) (23), containing routines that assist transfer of data between the components of the first computer (18), such as during start-up, can be stored in ROM (21). The first computer (18) can further include a hard disk drive (24) for reading from and writing to a hard disk (25), a magnetic disk drive (26) for reading from or writing to a removable magnetic disk (27), and an optical disk drive (28) for reading from or writing to a removable optical disk (29) such as a CD ROM or other optical media. The hard disk drive (24), magnetic disk drive (26), and optical disk drive (28) can be connected to the bus (20) by a hard disk drive interface (30), a magnetic disk drive interface (31), and an optical disk drive interface (32), respectively. The drives and their associated computer-readable media provide non-volatile storage of computer-readable instructions, data structures, program modules and other data for the first computer (18). A number of program modules may be stored on the hard disk drive (25), magnetic disk (27), optical disk (29), ROM (21), or RAM (22), including an operating system (33), one or a plurality of application programs (34) including the inventory control program (11) which can include a graphical user interface application (35) or other program interfaces. It can be appreciated by those skilled in the art that any type of computer-readable media that can store data that is accessible by a computer, such as magnetic cassettes, flash memory cards, digital video disks, Bernoulli cartridges, random access memories (RAMs), read only memories (ROMs), and the like, may be used in a variety of operating environments, and that the first computer (18) can include a wide variety of hardware such as set-top boxes, intelligent televisions connected to receive data through an entertainment medium such as a cable television network or a digital satellite broadcast, hand-held devices such as smart phones, tablet, slate or pad computers, personal digital assistants or camera/cell phone, or multiprocessor systems, microprocessor-based or programmable consumer electronics, network PCs, minicomputers, mainframe computers, or the like.

The first computer (18) may operate with network means (17) including one or more logical connections (36) to connect to one or more remote second computers (37). These logical connections (36) are achieved by one or more communication devices (38) coupled to or a part of the first computer (18) and the second computer (37); however, the invention is not limited to a particular type of communications device (38). The second computer (37) can be another computer, a server, a router, a network personal computer, a client, a peer device or other common network node, and can include a part or all of the elements above-described relative to the first computer (18). The logical connections (36) depicted in FIG. 2 can include a local-area network (LAN) (39) or a wide-area network (WAN) (40). Such networking environments are commonplace in offices, enterprise-wide computer networks, intranets, wireless networks, global satellite networks, cellular phone networks and the Internet (41).

When used in a LAN-networking environment (39), the first computer (18) can be connected to the local network through a network interface or adapter (42), which is one type of communications device (38). When used in a WAN-networking environment (40), the first computer (18) typically includes a modem (43), a type of communications device (38), or any other type of communications device for establishing communications over the wide area network (40), such as the Internet (41). The modem (43), which may be internal or external, can be connected to the bus (20) via a serial port interface (44). In a networked environment, program modules depicted relative to the first computer (18), or portions thereof, may be as to certain embodiments of the invention stored in one or more second computers (37). It is appreciated that the network connections shown are exemplary and other means of and communications devices for establishing a communications link between the computers can be used.

The first computer (18) and the second computer (37) can further include a display surface (45) such as a monitor screen or other type of display device can also be connected to the bus (20) via a display surface interface (46), such as a video adapter, or the like. A graphical user interface (35) can be depicted on the display surface (45) as one more user interactive graphical images (47). In addition to the display surface (45), the first computer (18) can further include other peripheral output devices (48) connect to the bus (20) by corresponding peripheral out device interfaces (49) such as: speakers and printers; although the peripheral output devices (48) are not so limited.

A user (50) may enter commands and information through input devices (51) such as a keyboard (52) or a pointing device (53) such as a mouse (54); however, any method or device that converts user action into commands and information can be utilized including, but not limited to: a microphone, joystick, game pad, touch screen, or the like.

A "click event" occurs when the user (50) operates a function of the inventory control program (11) (or other application program (34), module or the like) through the use of a command, for example, pressing or releasing a left mouse button (55) while a pointer icon (56) is located over a control icon (57) displayed in a user interactive image (47). However, it is not intended that a "click event" be limited to the press and release of the left mouse button (55) on a mouse (54) while a pointer icon (56) is located over a control icon (57), rather, a "click event" is intended to broadly encompass a command by the user (50) through which a function of the inventory control program (11) (or other application program (33), module or the like) can be activated or performed, whether through selection of one or a plurality of control icon(s) (57) or fields, or by user voice command, keyboard stroke, mouse button, display surface touch or otherwise. It is further intended that the control icons (57) can be configured or displayed without limitation as a bullet, a point, a circle, a triangle, a square, a polygon (or other configurations or combinations or permutations thereof), or as fields in which addresses such as a street address, zip code, county code, or natural area code, or inputting a latitude/longitude or projected coordinate X and Y, or other notation, script or character, or the like, whether populated manually or by operation of the inventory control program (11), or a portion or element thereof.

Again referring primarily to FIG. 2, in general, each of the second computers can include an Internet browser (105) (also referred to as a "browser") such as Microsoft's INTERNET EXPLORER, GOGGLE CHROME, MOZILLA, FIREFOX, or the like, which functions to download and render multimedia content that is formatted in "hypertext markup language" (HTML). In this environment, a memory element (15) of the first computer (18) can contain the inventory control program (11) including the signal analyzer (12), the inventory calculator (13) and the graphical user interface application (35) (or other interface applications), as further described below. As to these embodiments, the inventory control program (11) can be resident in the first server computer (18) and the one or more second computers (37) can use the browser (57) to display downloaded content and to relay user inputs back to the first computer (18). The first computer (18) would respond by formatting one or more new user interactive graphical images (47) for display on the display surface (45) (as shown in the illustrative examples of FIGS. 3 through 14).

In other embodiments, the one or more first computers (18) can be used primarily as sources of data or images, with primary responsibility for implementing the graphical user interface application (35) being placed upon each of the one or more second computers (37). As to these embodiments, each of the one or more second computers (37) can run the appropriate portions of the inventory control program (11).

Again referring primarily to FIGS. 1 and 2, embodiments of the invention can further include a wireless sender (58) which operates to generate and transmit a radio frequency signal (59) which can carry the sensor signal (2a) generated by the distance sensor (2) to a wireless receiver (60) coupled by a wireless receiver interface (61) to the bus (20) of the first computer (18) or the second computer (37). The wireless receiver (60) can receive the radio frequency signal (59) carrying the sensor signal (2a). The sensor signal (2a) can be analyzed by the signal analyzer (12), as above described. While the Figures show an embodiment of the invention which includes a wireless sender (58) and wireless receiver (60); particular embodiments of the invention can be hard wired between the distance sensor (2) and the first computer (18) or the second computer (37).

Additionally, as to particular embodiments, the term distance sensor (2) means a plurality of distance sensors (2) and the term target location (3) means a plurality of target locations (3) with one of the plurality of distance sensors (2) having a fixed position in relation to a corresponding one of the plurality of target locations (3). Accordingly, the plurality of distance sensors (2) generate a corresponding plurality of sensor signals (2a) each of which varies based on separation distance (10) between one of the plurality of distance sensors (2) and the corresponding target product (4) (or a stack (14) of target product (4)). As to these embodiments, the invention can further include a signal collector (62) which combines the plurality of sensor signals (2a) into a combined sensor signal (63) which can be transmitted (whether by wire or wirelessly) for analysis by the signal analyzer (12). The signal analyzer (12) can further function to analyze the combined sensor signal (63) to determine the separation distance (10) between each of the plurality of distance sensors (2) and each of the corresponding target products (4) (or stacks (7) of target product (4)).

Now referring primarily to FIGS. 3 through 12, embodiments of the invention include the processing unit (19) in communication with the memory (15) containing the inventory control program (11) including the graphical user interface application (35) executable to depict one or more user interactive graphical images (47) on a display surface (45). The graphical user interface application (35) can be implemented using various technologies and different devices, depending on the preferences of the designer and the particular efficiencies desired for a given circumstance.

Figure 3:
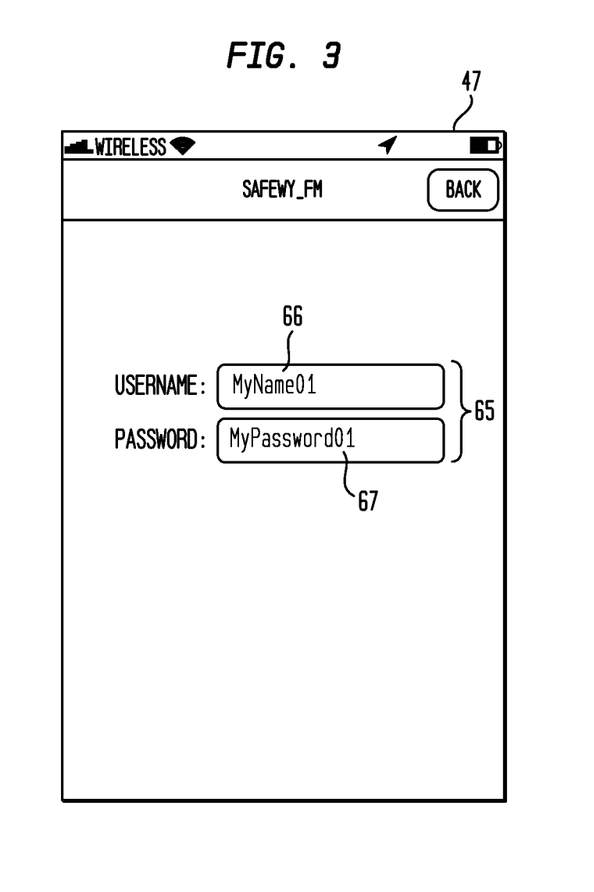
FIG. 3 is an illustration of a particular embodiment of a user interactive graphical image depicted on a graphical display surface which by user interaction allows access to the functionalities of an inventory control program.

Now referring primarily to FIGS. 2 and 3, the user (50) by "click event" can activate the inventory control program (11). The inventory control program (11) can further include a login module (64) which can function to depict on the display surface (45) a user interactive graphical image (47) (as shown in the example of FIG. 3) including a login format (65). As shown in the example of FIG. 3, the user (50) can enter a user name (66) and password (67); although other login formats (65) can be utilized depending up the application. The login module (64) functions to verify the identity of the user (50). As to the embodiment shown in FIG. 3, the login module (64) identifies the user name (66) and password (67) and allows implementation of the graphical user interface application (35) which functions to depict one or more additional user interactive graphical images (47) on the display surface (45).

Now referring primarily to FIGS. 2, and 4 through 8, the inventory control program (11) can further includes one or more an inventory control modules (68) each of which functions to display a one or more user interactive graphical images (47) which by click event allows the user (50) to select one or more corresponding inventory control module identifiers (69). As illustrative examples the one or more inventory control program module identifiers (69) associated with a corresponding one or more inventory control modules (68) can include, as illustrative examples: "sales reports", "inventory control", "replenish", "replenishment report", "inventory report", "historical invoices", "capture retail pricing" or the like.

Figure 4:
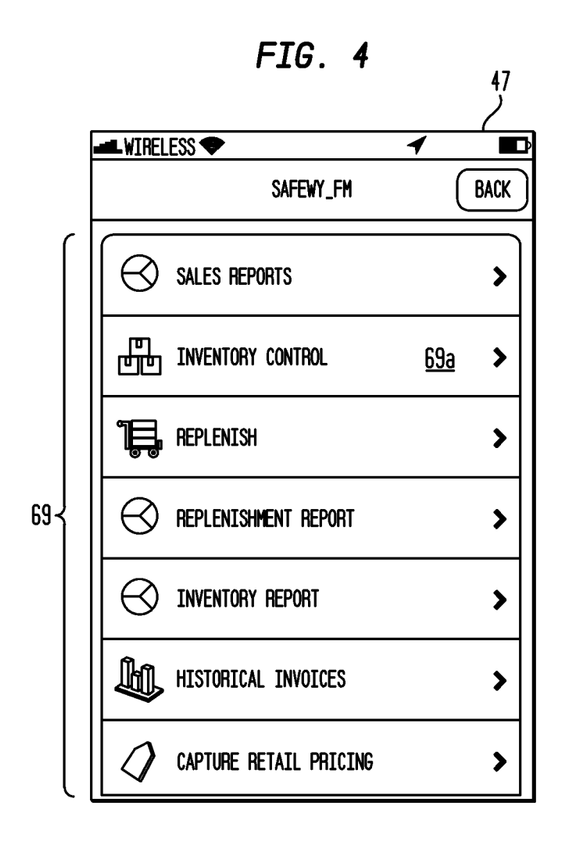
FIG. 4 is an illustration of a particular embodiment of the user interactive graphical image depicted on a graphical display surface which by user interaction allows access to the functionalities of an inventory control module.

Now referring primarily to FIG. 4, the user (50) by click event can select an inventory control identifier (69a) which triggers depiction of a series of a user interactive graphical images (47) (as shown the examples of FIGS. 5 through 8) by the corresponding inventory control module (68a) which allows the user (50) by click event to commence an interactive procedure to store a target location identifier (70) associated with a target location (3) in a target location identifier repository (71) contained in the memory (15).

Figure 5:
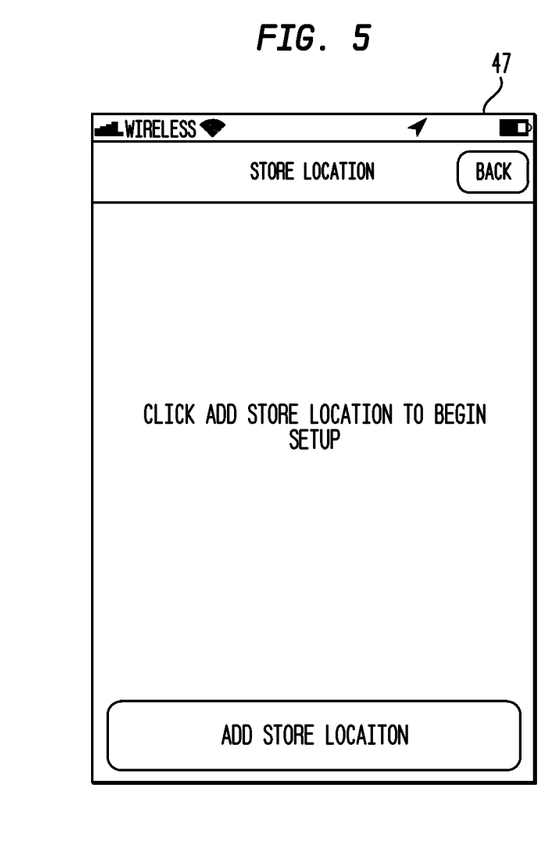
FIG. 5 is an illustration of a particular embodiment of the user interactive graphical image depicted on a graphical display surface which by user interaction allows access to the functionalities of an inventory control module which allow entry of one or more target location identifiers associated with a target location and one or more a target product identifiers associated with a target product.

Now referring primarily to FIG. 5, the inventory control module (68) can function to depict a user interactive graphical image (47) which allows the user by click event to add a target location (3) of a target product (4) positioned in relation to a distance sensor (2) with one or more target location identifiers (70).

Figure 6:
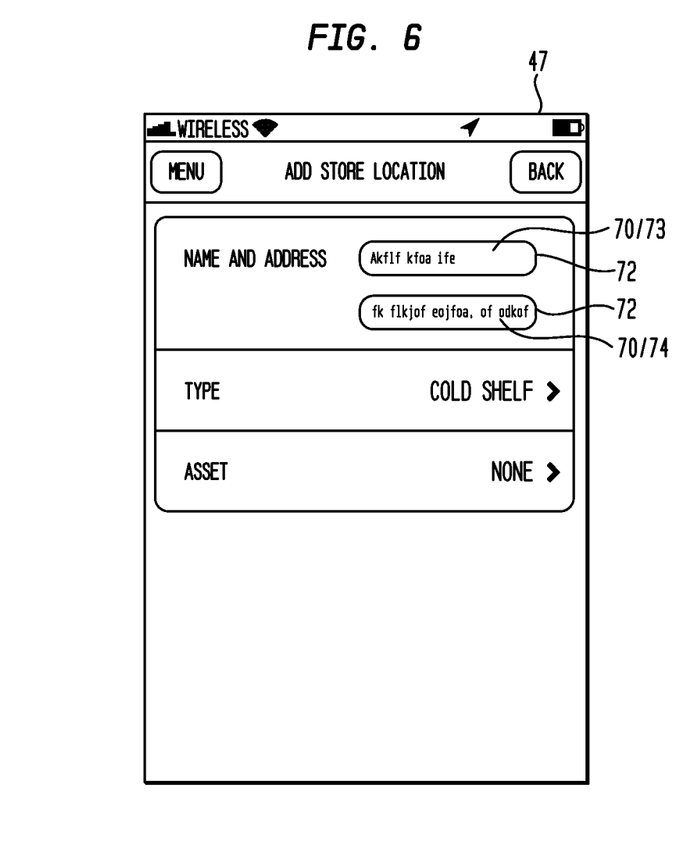
FIG. 6 is an illustration of a particular embodiment of the user interactive graphical image depicted on a graphical display surface which by user interaction allows entry of a target location identifier associated with the target location of a target product.

In the example of FIG. 6, the inventory control module (68) can function to depict a user interactive graphical image (4) including one or more target location identifier fields (72) in which the user (50) by click event can populate with a target location name (73) and a target location address (74) (whether geographical, coordinate, or otherwise) of a target product (4). The inventory control module (69) can further provide a graphical user image (47) which by click event allows the user (50) to further characterize the target location (3) by association with additional target location identifiers (70) to define the configuration of a target location (3) for the target product (4).

Figure 7:
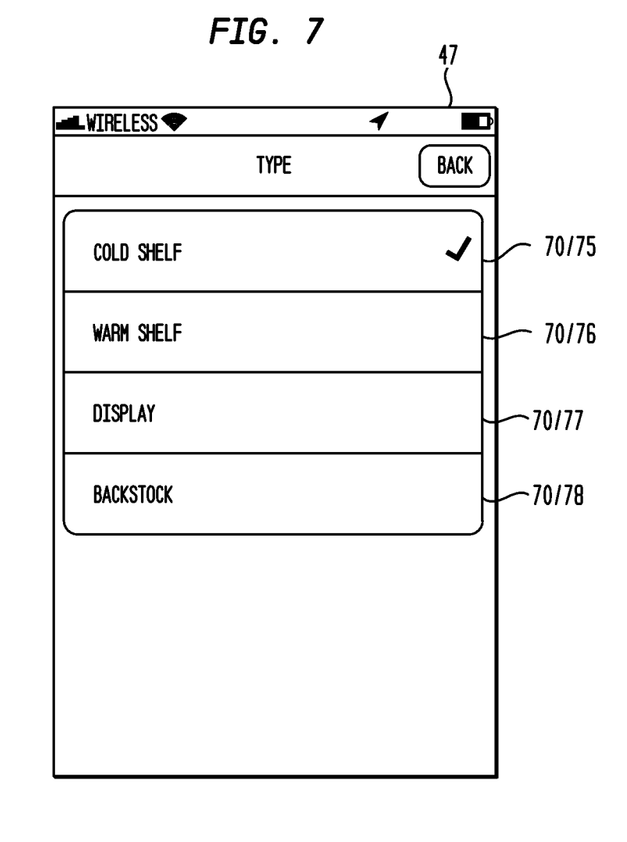
FIG. 7 is an illustration of a particular embodiment of the user interactive graphical image depicted on a graphical display surface which by user interaction allows entry of additional target location identifiers associated with the target location of a target product.

As shown in the illustrative example of FIG. 7, the user (50) by click event can add additional target location identifiers (70) to define the configuration of the target location (3) associated with a particular target product (4) (or associated with a particular distance sensor (2)) such as a cold shelf (75) or a warm shelf (76)), a display (77), backstock (78), or other identifiers which define the target location (4). The user (50) by click event can save the selected target location identifiers (70) associated with the target location (4) in the target location repository (71) contained in the memory (15).

Figure 8:
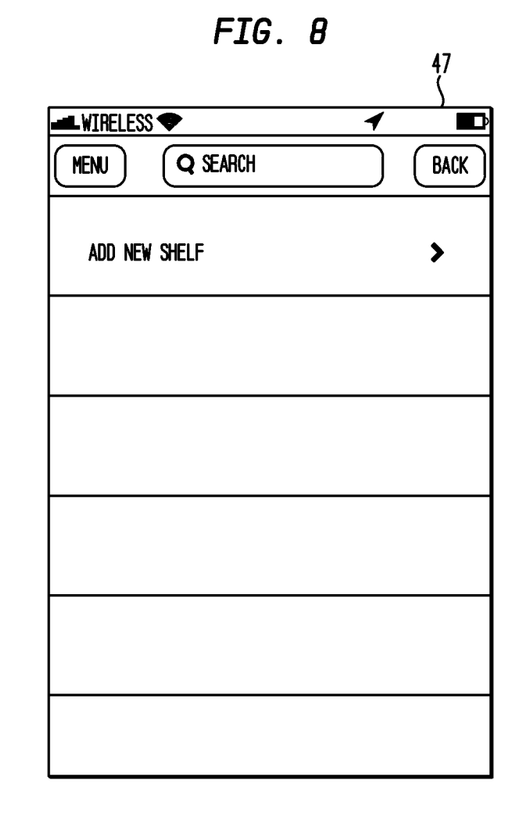
FIG. 8 is an illustration of a particular embodiment of the user interactive graphical image depicted on a graphical display surface which by user interaction allows the target identification process to be repeated to enter target identifiers associated with additional target locations for a target product.

As shown in FIG. 8, the user (50) by click event can repeat the stepwise process to generate a plurality target location identifiers (70) associated with a corresponding plurality of target locations (4) each of which can be retrievably stored in the target location repository (71).

Figure 9:
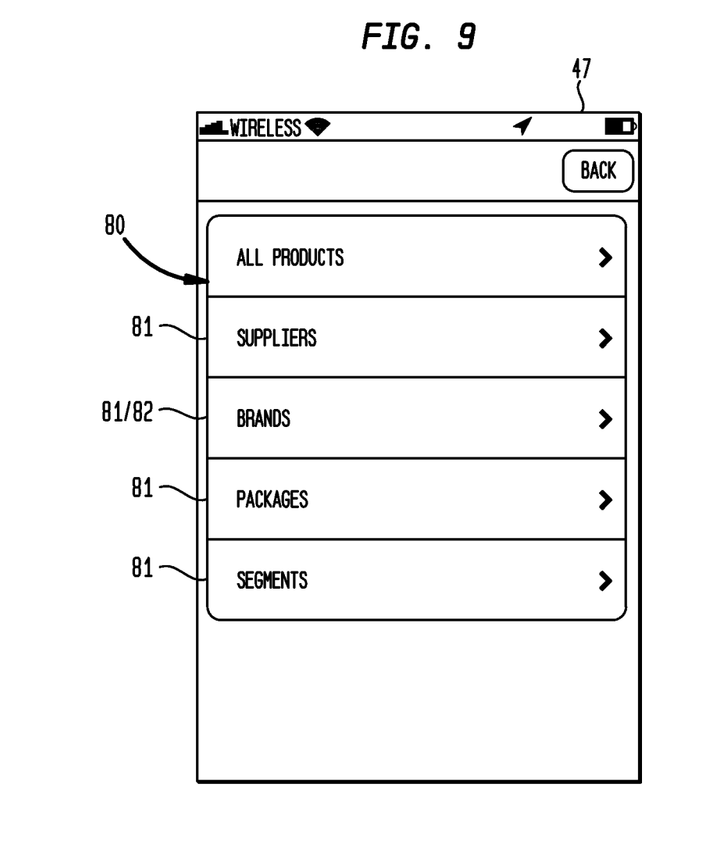
FIG. 9 is an illustration of a particular embodiment of the user interactive graphical image depicted on a graphical display surface which by user interaction allows entry of one or more target product identifiers associated with a target product at the identified target location.
Figure 10:
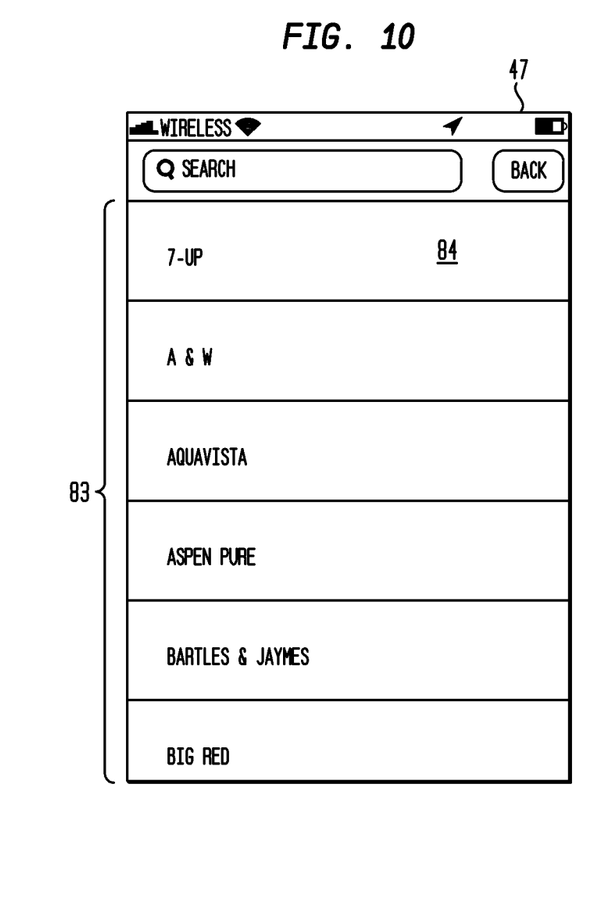
FIG. 10 is an illustration of a particular embodiment of the user interactive graphical image depicted on a graphical display surface which by user interaction allows entry of target product identifiers by drill down in one or more of a plurality of target product identifier categories associated with a target product at the identified target location.
Figure 11:
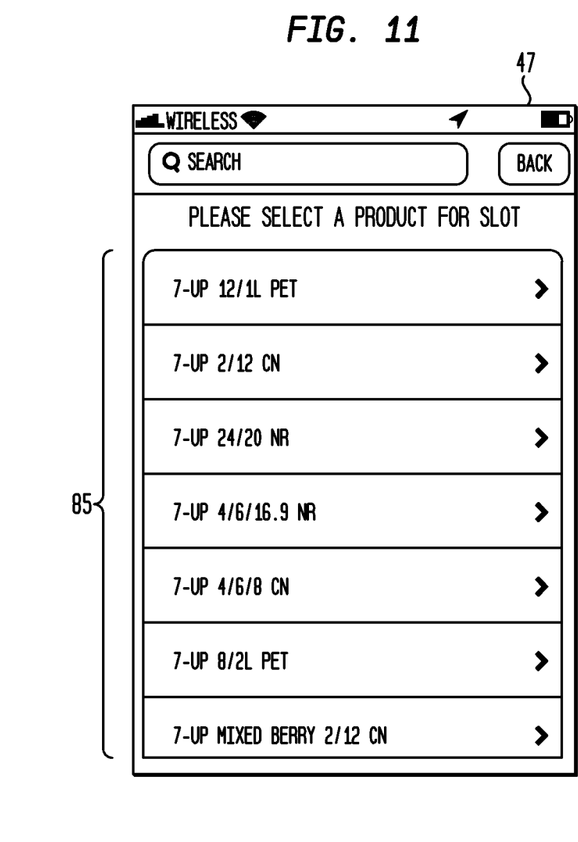
FIG. 11 is an illustration of a particular embodiment of the user interactive graphical image depicted on a graphical display surface which by user interaction allows entry of a target product identifier associated with the target product at the identified target location by drill down from a target identifier brand as illustrated in FIG. 10.

Now referring primarily to FIGS. 9 through 11, the inventory control module (68a) can display a subsequent set of user interactive graphical images (47) which allow the user (50) by click event to associate a target identifier (79) with each of the target products (4) located at the target location (4). As shown in the example of FIG. 9, as to particular embodiments of the invention, the user interactive graphical images (47) allow the user (50) by click event to select a target product identifier (79) from a list of all target product identifiers (80) or in a drill down process by serial presentation of successively narrowing lists of target product identifiers (81). For example, the user (50) by click event can select brand identifiers (82) (as shown in the example of FIG. 9) to display by operation of the inventory control module (69) a list of target brand identifiers (83) (as shown in the example of FIG. 10). The user (50) by click event can then select one target brand identifier from the list of target brand identifiers (83) (for example "7-UP" (84)) to display a list of target product identifiers (80) associated with the target brand identifier (82) (as shown in the example of FIG. 11). The user (50) by click event can then select a target product identifier (79) from the list of target product identifiers (80) (as shown in the example of FIG. 11 "7-UP 12/1L PET"). The user (50) by click event can retrievably store the selected target identifiers (79) associated with the target product (4) in a target identifier repository (85) contained in the memory (15).

Figure 12:
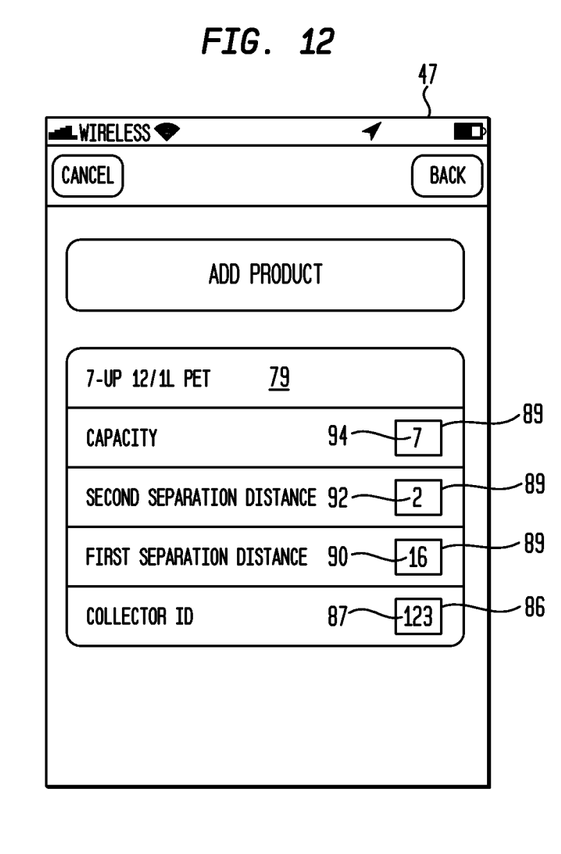
FIG. 12 is an illustration of a particular embodiment of the user interactive graphical image depicted on a graphical display surface which by user interaction or by operation of the inventory control program enters calculated values related to inventory capacity for a target product at a target location.

Now referring primarily to FIG. 12, the inventory control module (68a) can further depict a user interactive graphical image (47) which allows the user (50) by click event to populate a sensor identifier field (86) with a distance sensor identifier (87) (for example "123") which can be retrievably stored in a distance sensor repository (88) of the memory element (15). As shown in the example FIG. 13, the prior selected target identifier (79) ("7-UP 12/1L PET") can be associated with the distance sensor identifier (87) ("123").

Again referring primarily to FIG. 12, the inventory control module (68) can further function to depict a distance sensor identifiers (87) associated with a selected one of the target product identifiers (79) and further depict a plurality of inventory control fields (89) which can be populated by click event of the user (50) (or as to particular embodiments automatically populated by operation of the inventory control module (68a)) to display a first separation distance value (90) representing a first separation distance (91). The first separation distance (91) can be the distance between the distance sensor (2) and the target location (3) absent any target product (4) (as shown in the example of FIG. 1) which can be associated with the first separation distance value (90)) ("16" as shown in the example of FIG. 12). The inventory control module (68a)) can further display a second separation distance value (92) representing a second separation distance (93) with a full inventory of the target product (4) at the target location (3) (as shown as shown in the example of FIG. 1) which can be associated with a second separation distance value (93) ("2" as shown in the example of FIG. 12). The inventory control module (68a) can further depict, or the user (50) can enter by click event, an inventory capacity value (94) associated with the target product (4) at the target location (3). The inventory capacity value (94) represents the inventory capacity (106) at a target location (4) for receiving a target product (3) associated with the selected target product identifier (79) calculated based on the first separation distance value (92), As shown in the example of FIGS. 1 and 12, the inventory capacity value (94) associated with the inventory capacity (106) of the target product (4) associated with the target product identifier (79) ("7-UP 12/1L PET") is "7".

Again referring primarily to FIGS. 1 and 12, embodiments of the inventory control module (68a) can further function to calculate and associate a layer height separation distance value (95) with each uniform layer height (9) of the one or more layers (8) in a stack (7) of the target product (4) at the target location (3) (as shown in the example of FIG. 1). In the illustrative example of FIG. 12, the second separation distance value (92) ("2") associated with the first separation distance (91) can be subtracted from the first separation distance value (90) ("16") associated with the first separation distance (93) with the resulting difference in value ("14") divided by the inventory capacity value (94) ("7") to obtain the layer height separation value (95) ("2") associated with the uniform layer height (9) of a target product (4).

Figure 13:
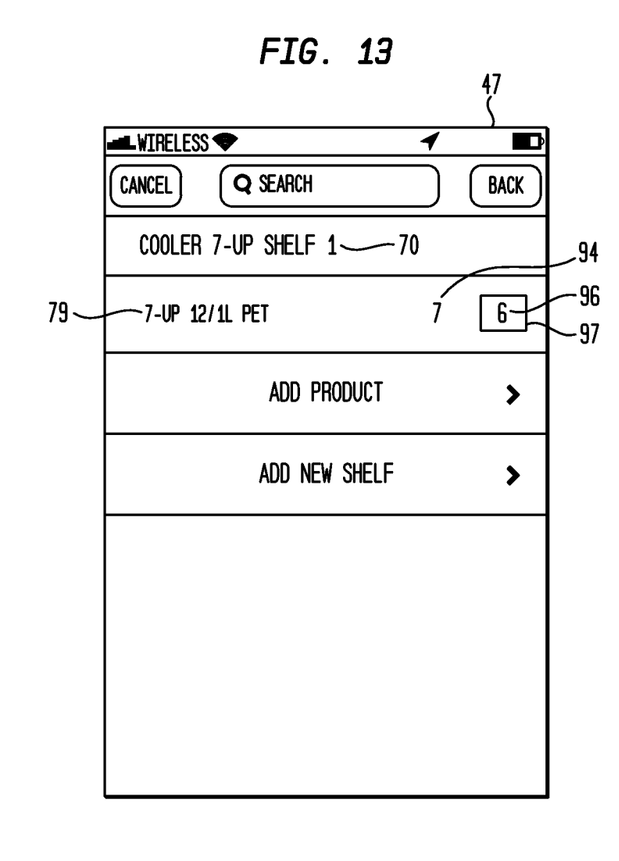
FIG. 13 is an illustration of a particular embodiment of the user interactive graphical image depicted on a graphical display surface which by user interaction or by operation of the inventory control program enters calculated values related to inventory level for a target product at a target location.

Now referring primarily to FIG. 13, the inventory control module (68a) can further function to display a user interactive graphical image (47) which upon click event by the user (50) to select a target location identifier (70) or select a distance sensor identifier (87) displays an inventory level value (96) representing the inventory level (14) of a target product (4) positioned at the target location (3) based on the separation distance (10) between the distance sensor (2) and the target product (4) or stack (7) of target product (4).

FIGS. 12 and 13 provide an illustrative example in which the target product (4) is associated with the target product identifier (79) ("7-UP 12/1L PET") having a target location (3) associated with the target location identifier (70) "COOLER 7-UP SHELF 1") which has an associated inventory capacity value (94) of "7". User (50) selection of the target location identifier (70) (or as to certain embodiments the distance sensor identifier (87) by click event activates the inventory calculator (13) which utilizes the separation distance (10) determined by the signal analyzer (12) for the selected target location (3). The inventory calculator (13) further functions to determine the inventory level (14) of the target product (3) associated with the product identifier (79) ("7-UP 12/1L PET") at the target location (3) and displays the inventory level value (96) (as shown in the example of FIG. 13 "6"). As to certain embodiments, the inventory level value (96) can be determined by comparing a first separation distance (91) (or first separation distance value (92)) to a second separation distance (93) (or second separation distance value (94)) to determine that the separation distance (10) at the target location (3) has increased from the first separation distance value (92) (for example "2" to "4") a difference of "2" which divided by the layer height separation distance value (95) (of "2 in the instant example of FIG. 13) indicates that one target product layer (8) of the target product (3) has been removed from the stack (7) resulting in an inventory level (14) of the target product (3) having a target product level identifier (96) (of "6" in the instant example of FIG. 13). The inventory level identifier (96) ("6") can by function of the inventory control module (68a) be depicted in an inventory level field (97) of the graphical user interface image (47). The inventory capacity value (94) (of "7" in the instant example of FIG. 13) for the target product (4) at the target location (3) can further be displayed by operation of the inventory control module (68a).

As to particular embodiments, the inventory calculator (13) can further function to calculate an initial inventory level (98) based on a first separation distance (91) between the distance sensor (2) and the target product (4) or stack (7) of target product (4) acquired at a first time point (99) and a closing inventory level (100) based on a second separation distance (93) between the distance sensor (2) and the target product (4) or stack (7) of target product (4) acquired at a second time point (101).

Figure 14:
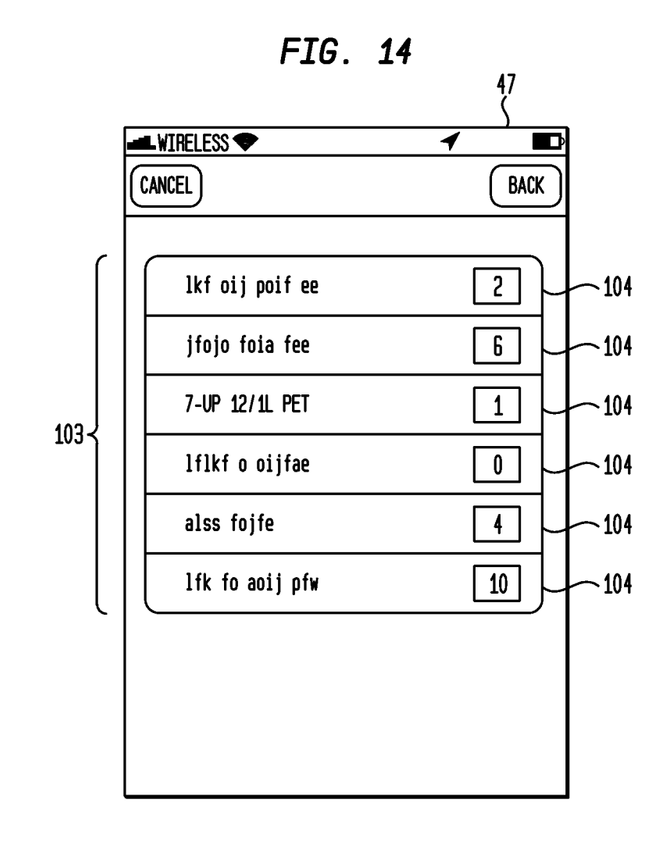
FIG. 14 is an illustration of a particular embodiment of the user interactive graphical image depicted on a graphical display surface which by user interaction or by operation of the inventory control program enters calculated target product replenishment values for one or more target product(s) at one or a target locations.

Now referring primarily to FIGS. 3 and 14, the inventory control program (11) can further include an inventory replenishment module (102) which upon selection by click event displays a user interactive graphical user interface (47) which allows a user (50) by click event to populate a plurality of inventory replenishment fields (103) with a corresponding plurality of target product replenishment values (104). As to particular embodiments, the inventory replenishment fields (103) can be populated with target product replenishment values (104) by operation of the inventory control module (68a). As shown in the example of FIG. 14, the replenishment value (104) for "7-UP 12/1L PET" can be "1" calculated by subtraction of the inventory level value (96) from the inventory capacity value (94).

As can be easily understood from the foregoing, the basic concepts of the present invention may be embodied in a variety of ways. The invention involves numerous and varied embodiments of an inventory control system and methods for making and using such inventory control system.

As such, the particular embodiments or elements of the invention disclosed by the description or shown in the figures or tables accompanying this application are not intended to be limiting, but rather exemplary of the numerous and varied embodiments generically encompassed by the invention or equivalents encompassed with respect to any particular element thereof. In addition, the specific description of a single embodiment or element of the invention may not explicitly describe all embodiments or elements possible; many alternatives are implicitly disclosed by the description and figures.

It should be understood that each element of an apparatus or each step of a method may be described by an apparatus term or method term. Such terms can be substituted where desired to make explicit the implicitly broad coverage to which this invention is entitled. As but one example, it should be understood that all steps of a method may be disclosed as an action, a means for taking that action, or as an element which causes that action. Similarly, each element of an apparatus may be disclosed as the physical element or the action which that physical element facilitates. As but one example, the disclosure of a "sensor" should be understood to encompass disclosure of the act of "sensing"—whether explicitly discussed or not—and, conversely, were there effectively disclosure of the act of "sensing", such a disclosure should be understood to encompass disclosure of a "sensor" and even a "means for sensing." Such alternative terms for each element or step are to be understood to be explicitly included in the description.

In addition, as to each term used it should be understood that unless its utilization in this application is inconsistent with such interpretation, common dictionary definitions should be understood to included in the description for each term as contained in the Random House Webster's Unabridged Dictionary, second edition, each definition hereby incorporated by reference.

All numeric values herein are assumed to be modified by the term "about", whether or not explicitly indicated. For the purposes of the present invention, ranges may be expressed as from "about" one particular value to "about" another particular value. When such a range is expressed, another embodiment includes from the one particular value to the other particular value. The recitation of numerical ranges by endpoints includes all the numeric values subsumed within that range. A numerical range of one to five includes for example the numeric values 1, 1.5, 2, 2.75, 3, 3.80, 4, 5, and so forth. It will be further understood that the endpoints of each of the ranges are significant both in relation to the other endpoint, and independently of the other endpoint. When a value is expressed as an approximation by use of the antecedent "about," it will be understood that the particular value forms another embodiment. The term "about" generally refers to a range of numeric values that one of skill in the art would consider equivalent to the recited numeric value or having the same function or result. Similarly, the antecedent "substantially" means largely, but not wholly, the same form, manner or degree and the particular element will have a range of configurations as a person of ordinary skill in the art would consider as having the same function or result. When a particular element is expressed as an approximation by use of the antecedent "substantially," it will be understood that the particular element forms another embodiment.

Moreover, for the purposes of the present invention, the term "a" or "an" entity refers to one or more of that entity unless otherwise limited. As such, the terms "a" or "an", "one or more" and "at least one" can be used interchangeably herein.

Thus, the applicant(s) should be understood to claim at least: i) each of the inventory control devices and inventory control systems herein disclosed and described, ii) the related methods disclosed and described, iii) similar, equivalent, and even implicit variations of each of these devices and methods, iv) those alternative embodiments which accomplish each of the functions shown, disclosed, or described, v) those alternative designs and methods which accomplish each of the functions shown as are implicit to accomplish that which is disclosed and described, vi) each feature, component, and step shown as separate and independent inventions, vii) the applications enhanced by the various systems or components disclosed, viii) the resulting products produced by such systems or components, ix) methods and apparatuses substantially as described hereinbefore and with reference to any of the accompanying examples, x) the various combinations and permutations of each of the previous elements disclosed.

The background section of this patent application provides a statement of the field of endeavor to which the invention pertains. This section may also incorporate or contain paraphrasing of certain United States patents, patent applications, publications, or subject matter of the claimed invention useful in relating information, problems, or concerns about the state of technology to which the invention is drawn toward. It is not intended that any United States patent, patent application, publication, statement or other information cited or incorporated herein be interpreted, construed or deemed to be admitted as prior art with respect to the invention.

The claims set forth in this specification, if any, are hereby incorporated by reference as part of this description of the invention, and the applicant expressly reserves the right to use all of or a portion of such incorporated content of such claims as additional description to support any of or all of the claims or any element or component thereof, and the applicant further expressly reserves the right to move any portion of or all of the incorporated content of such claims or any element or component thereof from the description into the claims or vice-versa as necessary to define the matter for which protection is sought by this application or by any subsequent application or continuation, division, or continuation-in-part application thereof, or to obtain any benefit of, reduction in fees pursuant to, or to comply with the patent laws, rules, or regulations of any country or treaty, and such content incorporated by reference shall survive during the entire pendency of this application including any subsequent continuation, division, or continuation-in-part application thereof or any reissue or extension thereon.

Additionally, the claims set forth in this specification, if any, are further intended to describe the metes and bounds of a limited number of the preferred embodiments of the invention and are not to be construed as the broadest embodiment of the invention or a complete listing of embodiments of the invention that may be claimed. The applicant does not waive any right to develop further claims based upon the description set forth above as a part of any continuation, division, or continuation-in-part, or similar application.

I claim:

1. A method for inventory control, comprising:
   locating a distance sensor at a fixed position in relation to a target location, said distance sensor generating a signal which varies based upon a first separation distance between said distance sensor and said target location absent a target product located between said distance sensor and said target location;
   communicatively coupling a processor with a memory element containing an inventory control program, said inventory control program executable to:
   analyze said sensor signal to determine said first separation distance between said distance sensor and said target location absent any target product;
   retrieve one or more target location identifiers associated with said target location;
   define a target location configuration based upon retrieval of said one or more target location identifiers;
   associate one or more target product identifiers with said target location configuration;
   calculate an inventory capacity of said target product in said target location configuration at said target location based upon said first separation distance at said target location absent said target product.

2. The method of inventory control of claim 1, wherein said inventory control program is further executable to:
   calculate an initial inventory level based on a second separation distance between said distance sensor and said target product acquired at a first time point; and
   calculate a closing inventory level based on a third separation distance between said distance sensor and said target product acquired at a second time point.

3. The method of inventory control of claim 2, wherein said inventory control program is further executable to calculate a change between said initial inventory level and said closing inventory level.

4. The method of inventory control of claim 3, further comprising:
   coupling a signal collector to a plurality of distance sensors for combining a plurality sensor signals into a combined signal for analysis; and wherein said inventory control program is executable to:
   analyze said combined sensor signals; and
   determine said separation distance between each of said plurality of distance sensors and said plurality of target products.

5. The method of inventory control of claim 4, wherein said inventory control program is further executable to depict one or more user interactive graphical images on a graphical display surface and further comprising entering a target location identifier in said user interactive graphical images to retrievably store said target location identifier in a target location repository contained said memory element, said target location identifier associated with said target location.

6. The method of inventory control of claim 5, further comprising entering a target identifier in said user interactive graphical images to retrievably store said target identifier in a target identifier repository contained in said memory element, said target identifier associated with said target product.

7. The method of inventory control of claim 6, further comprising entering a distance sensor identifier in said user interactive graphical images to retrievably store said distance sensor identifier in a distance sensor identifier repository contained in said memory element, said distance sensor identifier associated with said distance sensor.

8. The method of inventory control of claim 7, wherein said inventory control program is further executable to depict an inventory capacity value for said target location in said user interactive graphical image, and further comprising viewing said inventory capacity value in said user interactive graphical image.

9. The method of inventory control of claim 8, wherein said inventory control program is further executable to depict an inventory level value for said target product at said target location, and further comprising viewing said inventory level value in said user interactive graphical image.

10. The method of inventory control of claim 9, wherein said inventory control program is further executable to calculate and depict a target product replenishment value for said target product at said target location, and further comprising viewing said target product replenishment value in said user interactive graphical image.

\* \* \* \* \*